United States Patent [19]

Gregory

[11] Patent Number: 4,905,181

[45] Date of Patent: Feb. 27, 1990

[54] INTERACTIVE SYSTEM WITH STATE MANAGER SUBSYSTEM

[75] Inventor: Keith E. Gregory, Acton, Mass.

[73] Assignee: Wang Laboratories, Inc., Lowell, Mass.

[21] Appl. No.: 40,405

[22] Filed: Apr. 20, 1987

[51] Int. Cl.<sup>4</sup> ............................................. G06F 13/00
[52] U.S. Cl. ................................. 364/900; 364/977.5
[58] Field of Search ... 364/900 MS File, 200 MS File, 364/303

[56] References Cited

U.S. PATENT DOCUMENTS

| Re. 32,253 | 9/1986 | Bartulis et al. | 364/900 |
|---|---|---|---|
| 4,038,640 | 7/1977 | Lee et al. | 364/200 |
| 4,503,515 | 3/1985 | Cuan et al. | 364/900 |
| 4,509,122 | 4/1985 | Agnew et al. | 364/200 |
| 4,539,653 | 9/1985 | Bartlett et al. | 364/900 |
| 4,586,158 | 4/1986 | Brandle | 364/900 |
| 4,642,790 | 2/1987 | Minshull et al. | 364/900 |
| 4,648,047 | 3/1987 | Berkland et al. | 364/519 |
| 4,649,513 | 3/1987 | Martin et al. | 364/900 |

Primary Examiner—David Y. Eng
Assistant Examiner—Robert B. Harrell
Attorney, Agent, or Firm—Michael H. Shanahan; Gordon E. Nelson

[57] ABSTRACT

An interactive system has a component which manages interactions with the user and a component which manages data transformations. Communication between the interactive component and the data transformation component is by means of a state manager component. The state manager component includes an expected state description, which describes operation of the interactive system as a set of states and transitions therebetween, and an active state description, which describes as much of the present and past state of the interactive system as is required to determine the next state and to "back out" of the present state is response to user inputs specifying "cancel" or "undo" operations. Routines in the state manager interpret the expected state description and the active state description in response to inputs from the interactive component and the data transformation component, and as determined by the inputs and the state descriptions, the routines perform a transition to a new state and produce an output to the interactive component or the data transformation component. In the state model used in the state descriptions, initiating a state involves determining whether any conditions for entry have been fulfilled and activating substates, while completing a state involves determining whether any conditions for exit from the state have been fulfilled and determining the state to which a transition is to be attempted.

5 Claims, 13 Drawing Sheets

PRIOR ART INTERACTIVE SYSTEM 101

FIG. 1 PRIOR ART INTERACTIVE SYSTEM 101

FIG. 2 INTERACTIVE SYSTEM WITH STATE MANAGER 201

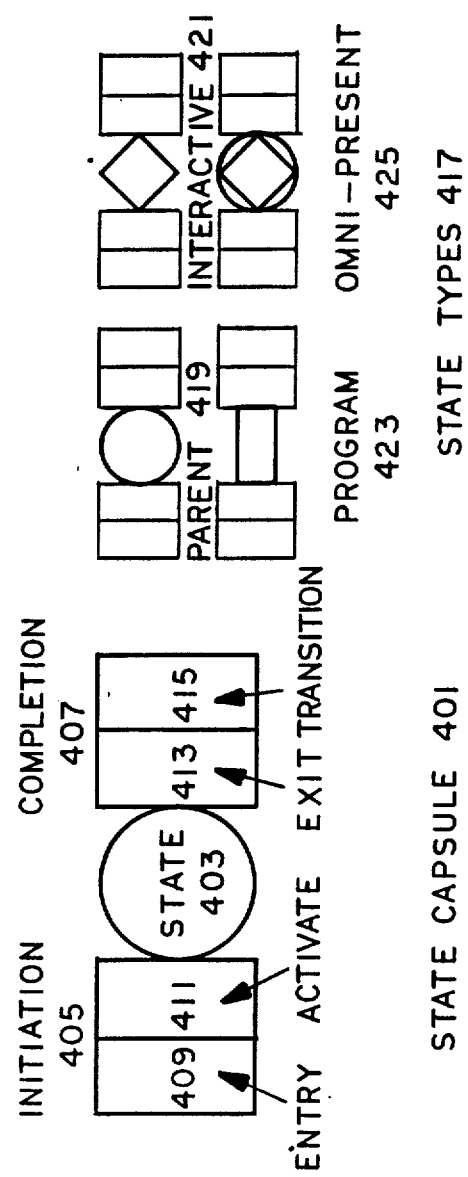
FIG. 4  STATE REPRESENTATIONS

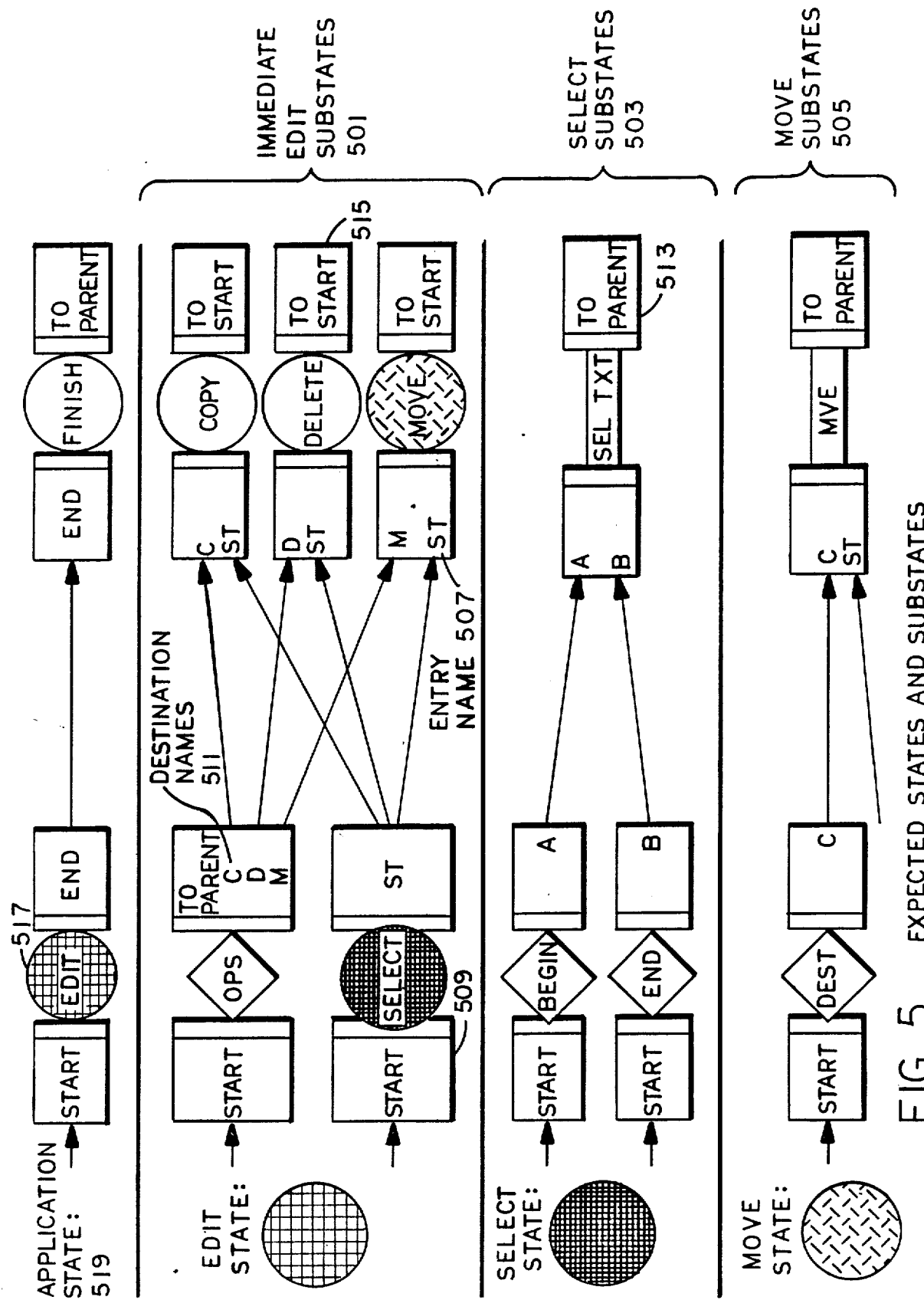
FIG. 5 EXPECTED STATES AND SUBSTATES

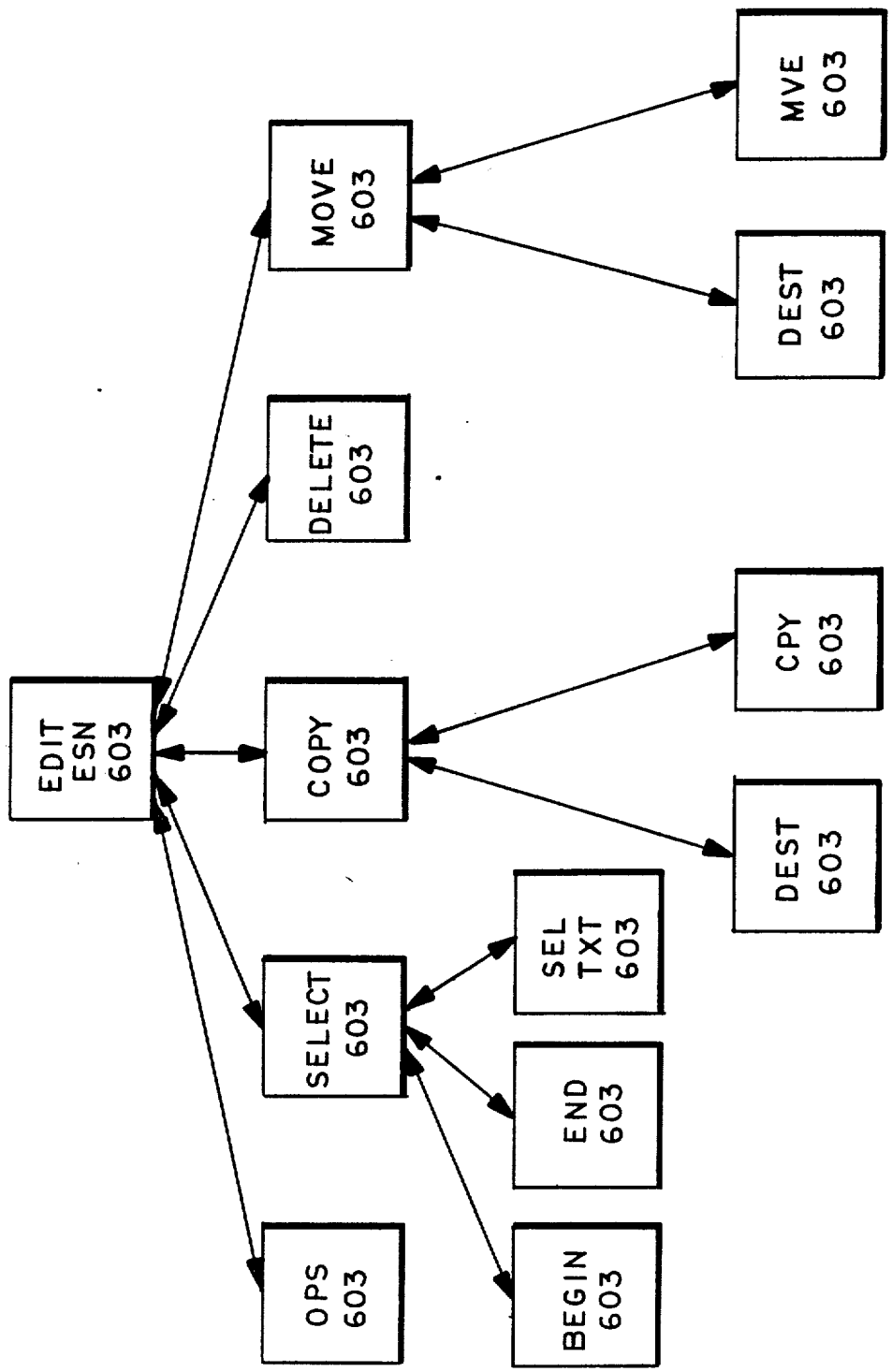
FIG. 6  OVERVIEW OF ESD 601 FOR EDIT

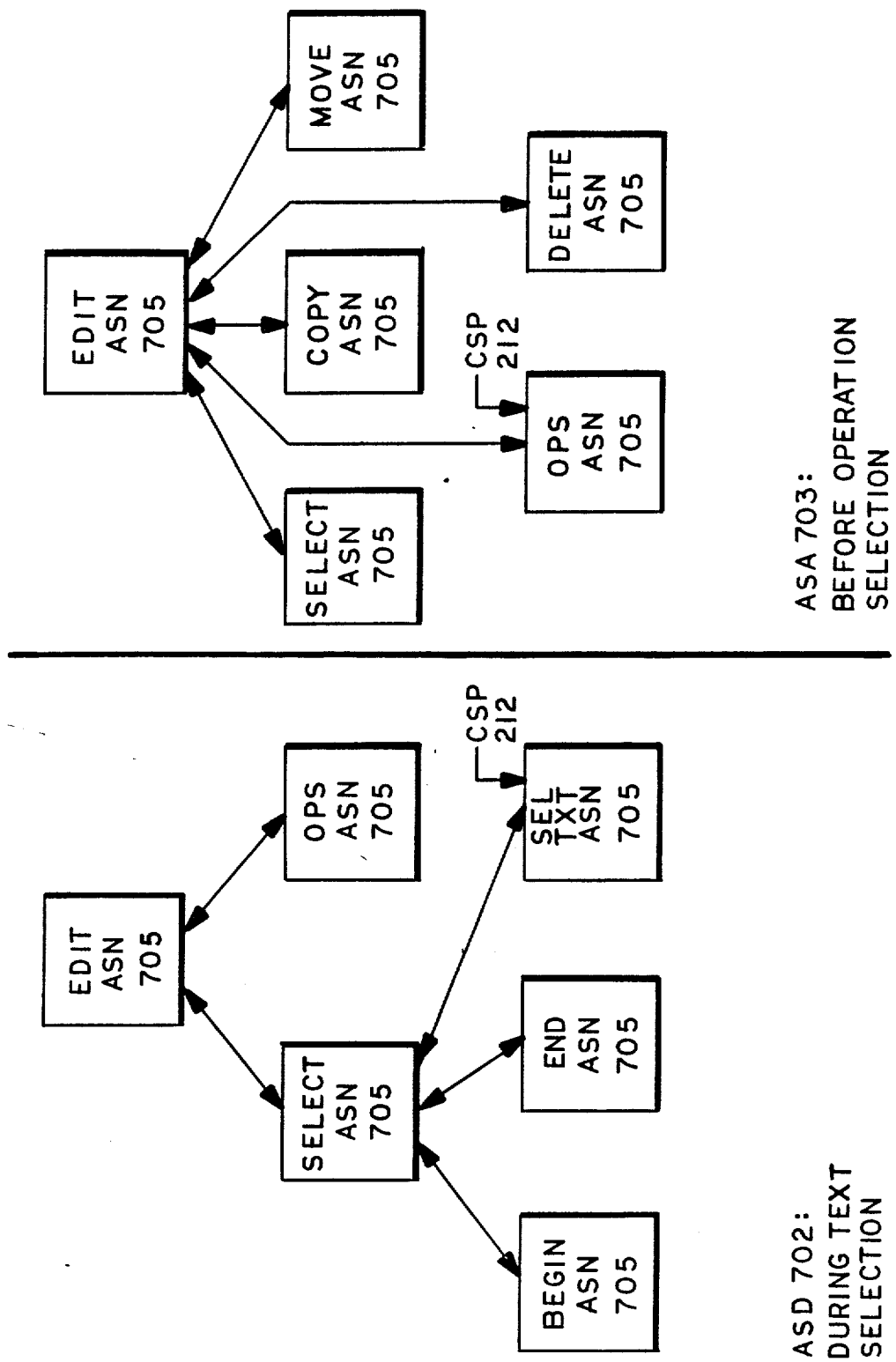
FIG. 7 OVERVIEW OF ASAs 701 FOR EDIT

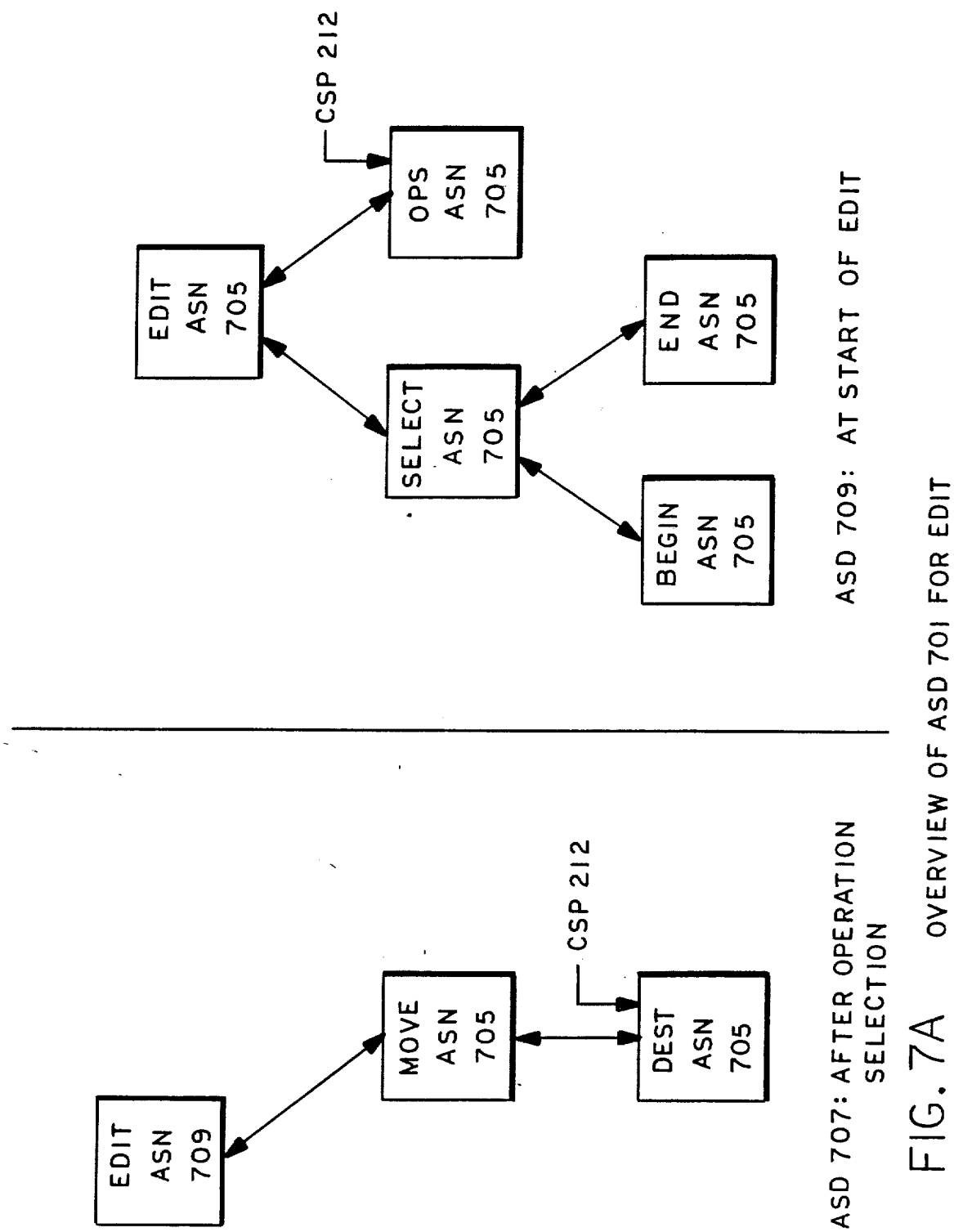
FIG. 7A  OVERVIEW OF ASD 701 FOR EDIT

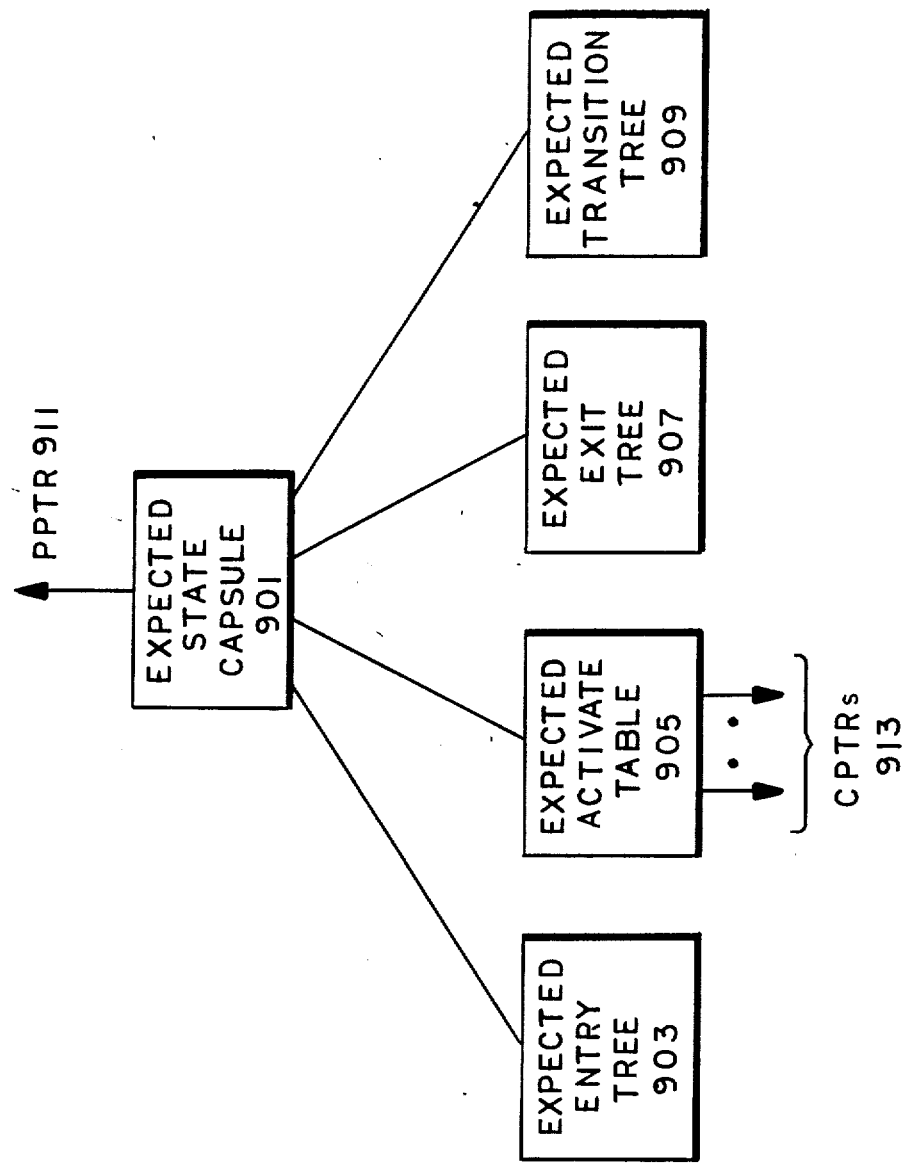
FIG. 9   ESN603 DETAIL

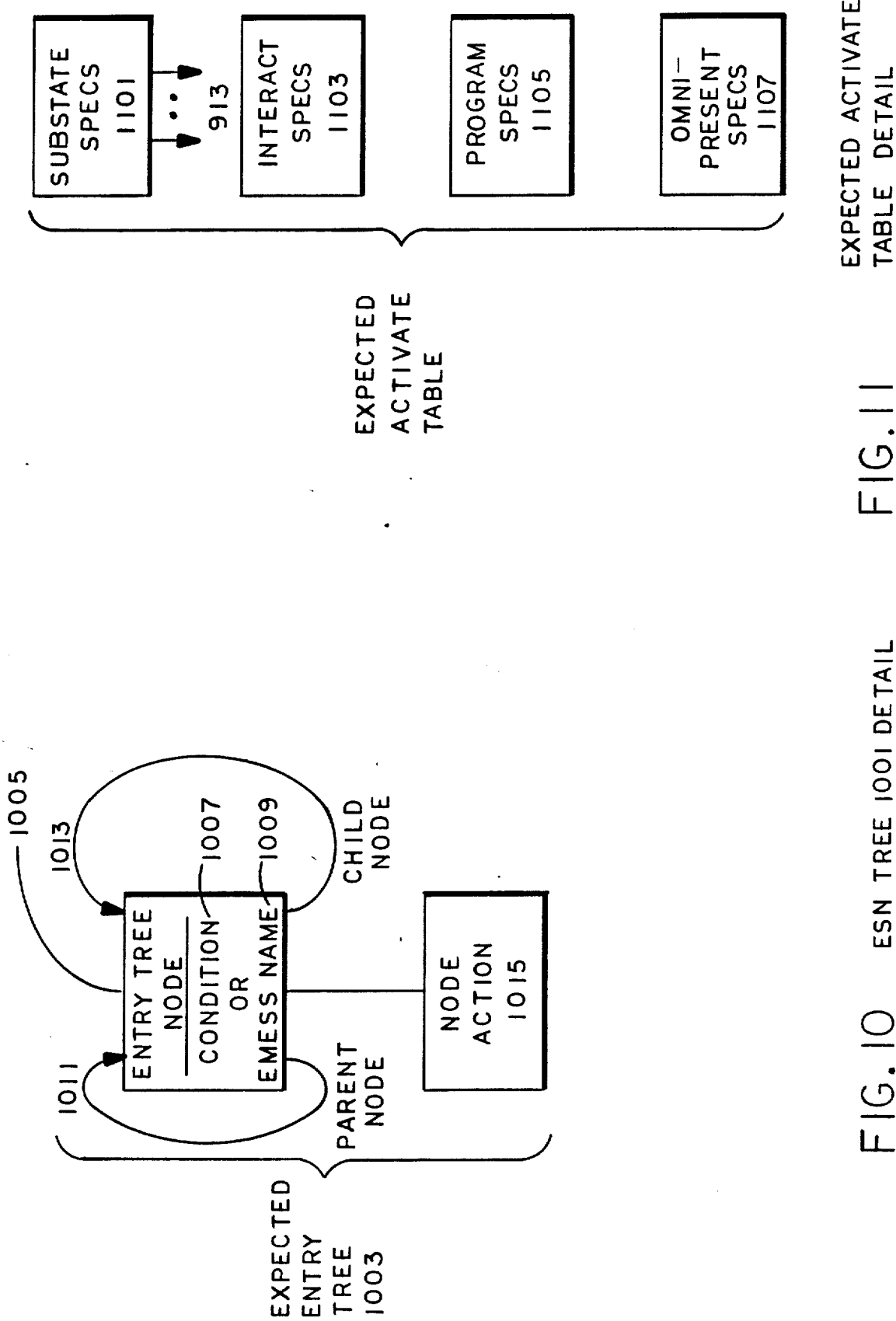

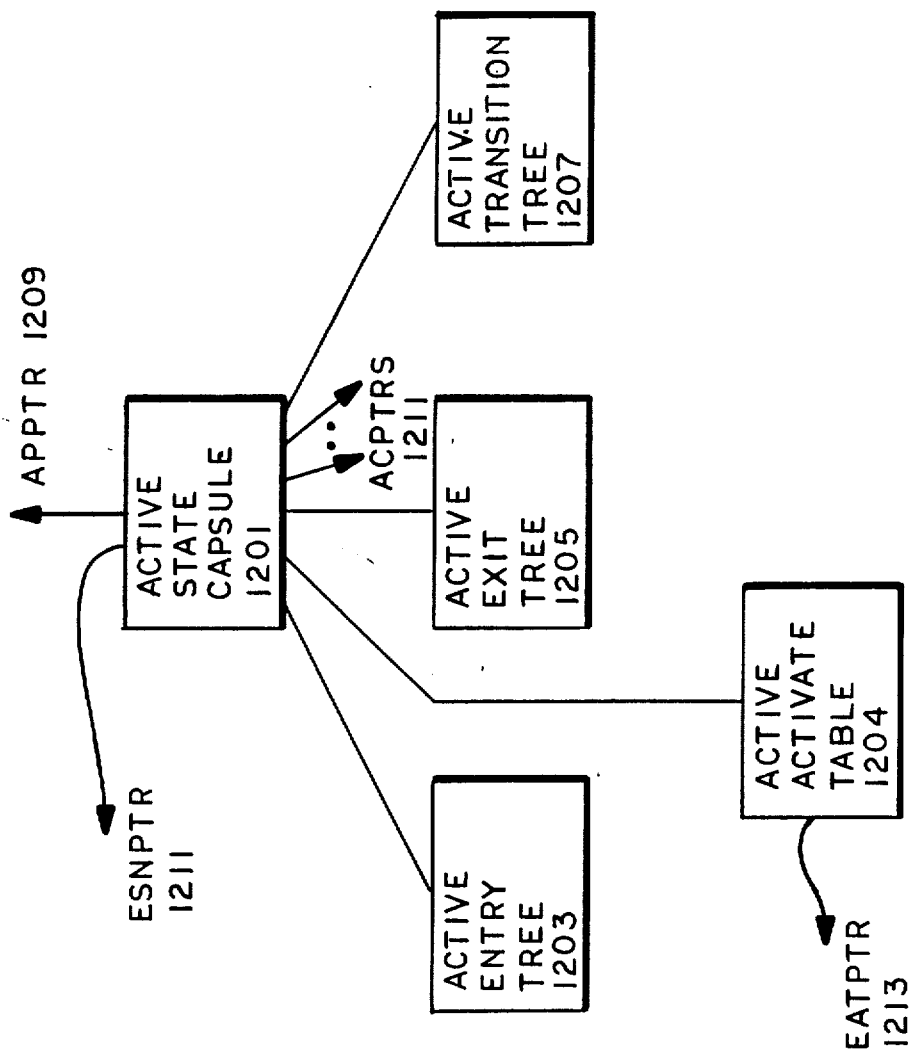
FIG. 12    ASN 705 DETAIL

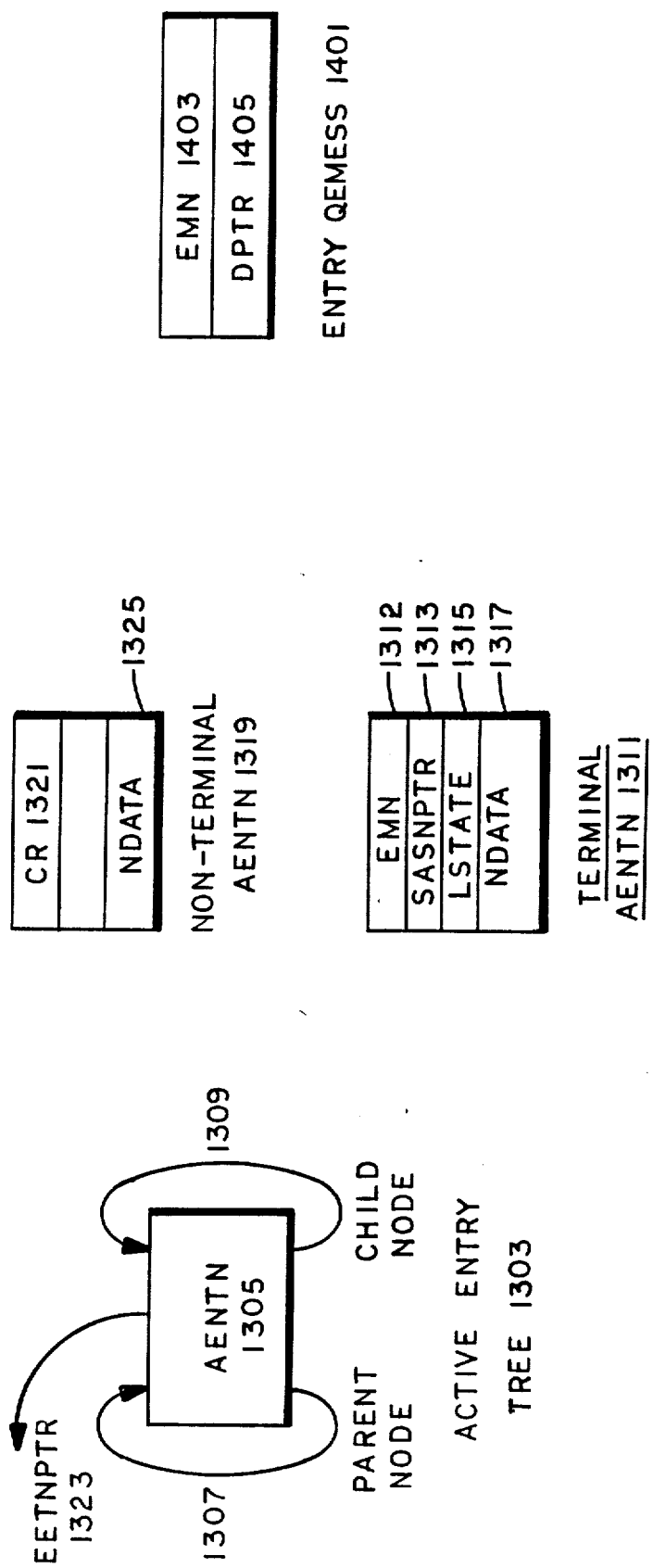
FIG. 14 QEMESS 813 DETAIL
FIG. 13 ASN TREE 1301 DETAIL

INTERACTIVE SYSTEM WITH STATE MANAGER SUBSYSTEM

BACKGROUND OF THE INVENTION

1. Field of the Invention

The present invention relates generally to digital data and word processing systems and more particularly to apparatus for controlling operation of such systems.

2. Description of the Prior Art: FIG. 1

There has been an enormous increase in the power and reduction in the price of computer systems. One consequence of this development has been the rise of interactive computing, in which a user interacts directly with the computer system by means of a display device such as a cathode ray tube and an input device such as a keyboard or mouse. As the power of the available computers and display devices has increased and the technical sophistication of the users has decreased, easy and sophisticated interaction has become increasingly important. In the first interactive systems, the unit of interaction was a line of characters and the input device was the keyboard. Later, the unit of interaction became a screenful of text, and the input device was a keyboard with special function keys. Still later, the unit of interaction became a screen with graphics capabilities, and users could interact by means of a mouse as well as with the keyboard. Presently, the use of windows permits the user to interact with a number of virtual screens at once.

As the interaction with the user has grown more sophisticated, systems have been developed to make it easier for programmers to specify interactions. Originally, the programmer who wrote interactive programs had to have an intimate knowledge of the interactive hardware; later, logical interfaces were provided for the interactive hardware; still later, hardware-independent user interface systems were developed.

FIG. 1 is a block diagram of an interactive system with such a hardware-independent user interface system. The interactive system of FIG. 1 has three main components: user interface subsystem (UIS) 119, application programs 103, and data tranformation Primitives (DTPR) 131. UIS 119 is a library of routines which provide the applications programs with a high-level logical interface for user interactions with interactive hardware 129. The routines in UIS 119 receive user-destined inputs UDI 111 describing displays on DISP 125 from applications 103 and provide logical outputs describing inputs from the user on SDO 113. They use inputs UDI 111 to produce user-perceivable outputs UPO 121 to display device 125 and produce system-destined outputs SDO 113 from user-provided inputs UPI 123 from input device 127.

DTPR 131 is a library of routines and operating system functions which performs data transformations such as reading from and writing to a file, locating information in a data base, and performing communications functions. Again, the applications programs are provided with a high-level interface to these functions and to processing hardware 137, consisting of hardware such as disk drives 133 and links to networks 135. Input to DTPR 131 from applications 115 is problem input 115; the output is problem output 117.

Applications 103, finally, are the programs such as spread sheets, text editors, text formatters, and the like which the user employs to do his work. The routines (App) 105 making up these programs call routines in UIS 119 when they are interacting with the user and routines in DTPR 131 when they are doing data transformations. As might be expected from this, a large portion of the code in an App 105 is interactive code (IC) 107, which involves UIS 119, and another large portion is transformation code (TC) 109. Many of the Apps 105 are themselves primitive routines which are used by higher-level routines. For example, many user applications do some text editing, and in modern interactive systems, all applications which do text editing may use the same set of text editing primitive Apps 105.

Systems such as that of FIG. 1 have made it easier for programmers to provide sophisticated interactions, and by providing all programmers with the same set of high-level primitives, have increased the uniformity of the interactive interface in the system, but they leave one fundamental problem unsolved: each routine in Applications 103 is free to use the routines in UIS 119 as it sees fit. Interactive system 101 appears as a single consistent interactive system to its users only to the extent that the programmers who write Applications 103 follow a standard in their use of UIS 119. Nowhere in interactive system 101 is there an entity which represents the entire interactive system. This problem is solved by the present invention.

SUMMARY OF THE INVENTION

The invention is an interactive system which has three components: a user interaction subsystem, a data transformation subsystem, and a state manager subsystem. The user interaction subsystem receives a user-destined input and a user-produced input and produces a user-perceivable output and a system-destined output. The data transformation subsystem receives a problem input and produces a result output. The state manager subsystem receives state manager inputs including the system-designed output and the result output and produces state manager outputs including the problem input and the user-destined input. The subsystem includes an expected state description which describes a set of expected states of the interactive system and the transitions therebetween, an active state description for describing a set of currently active states of the interactive system, and state management means which responds to a state manager input, to the expected state description, and the active state description by producing transitions to new states as required by the current set of active states, the state manager input, and the expected states, modifying the set of active states to produce a new current set thereof, and producing a state manager output in connection with certain of the transitions. By thus mediating between the interactive part of the computer system and the problem-related part in accordance with the expected state description, the state manager subsystem ensures that the user of the system is presented with a uniform interface.

In another aspect of the invention, the state manager subsystem receives substantially all of the system-destined outputs and result outputs and produces substantially all of the user-destined inputs and problem inputs. The state manager subsystem further manages a transition between a first state and a second state by performing the steps of determining whether the first state has been completed, indicating that the completion of the first state has fulfilled an entry condition of the second state, determining whether all entry conditions of the second state are fulfilled, and when all entry conditions are fulfilled, beginning the second state.

It is thus an object of the invention to provide an improved digital computing system.

It is another object of the invention to provide an improved interactive digital computing system.

It is a further object of the invention to provide an interactive digital computing system having a more uniform interactive interface.

It is an additional object of the invention to provide an interactive digital computer system wherein the interactive interface is determined by a state manager subsystem employing an expected state description and an active state description.

It is a still further object of the invention to provide an interactive digital computer system wherein a state manager subsystem mediates substantially all communication between the user interaction subsystem and the data transformation subsystem.

It is yet another object of the invention to provide a method whereby a state manager manages transitions between states.

Other objects and advantages of the present invention will be understood by those of ordinary skill in the art after referring to the detailed description of a preferred embodiment contained herein and the drawings; wherein:

BRIEF DESCRIPTION OF DRAWINGS

FIG. 4 is a diagram showing representations of states.

FIG. 5 is a diagram showing expected states and substates.

FIG. 6 is an overview of an expected state description of an EDIT operation.

FIGS. 7 and 7A are overviews of ASD 701 at various points in an EDIT operation.

FIG. 9 is a detail of an ESN 603.

FIG. 10 is a detail of an ESN tree 1001.

FIG. 11 is a detail of Expected Activate Table 905.

FIG. 12 is a detail of ASN 705.

FIG. 13 is a detail of an ASN tree 1301.

FIG. 14 is a detail of QEMESS 813.

Figure 1:
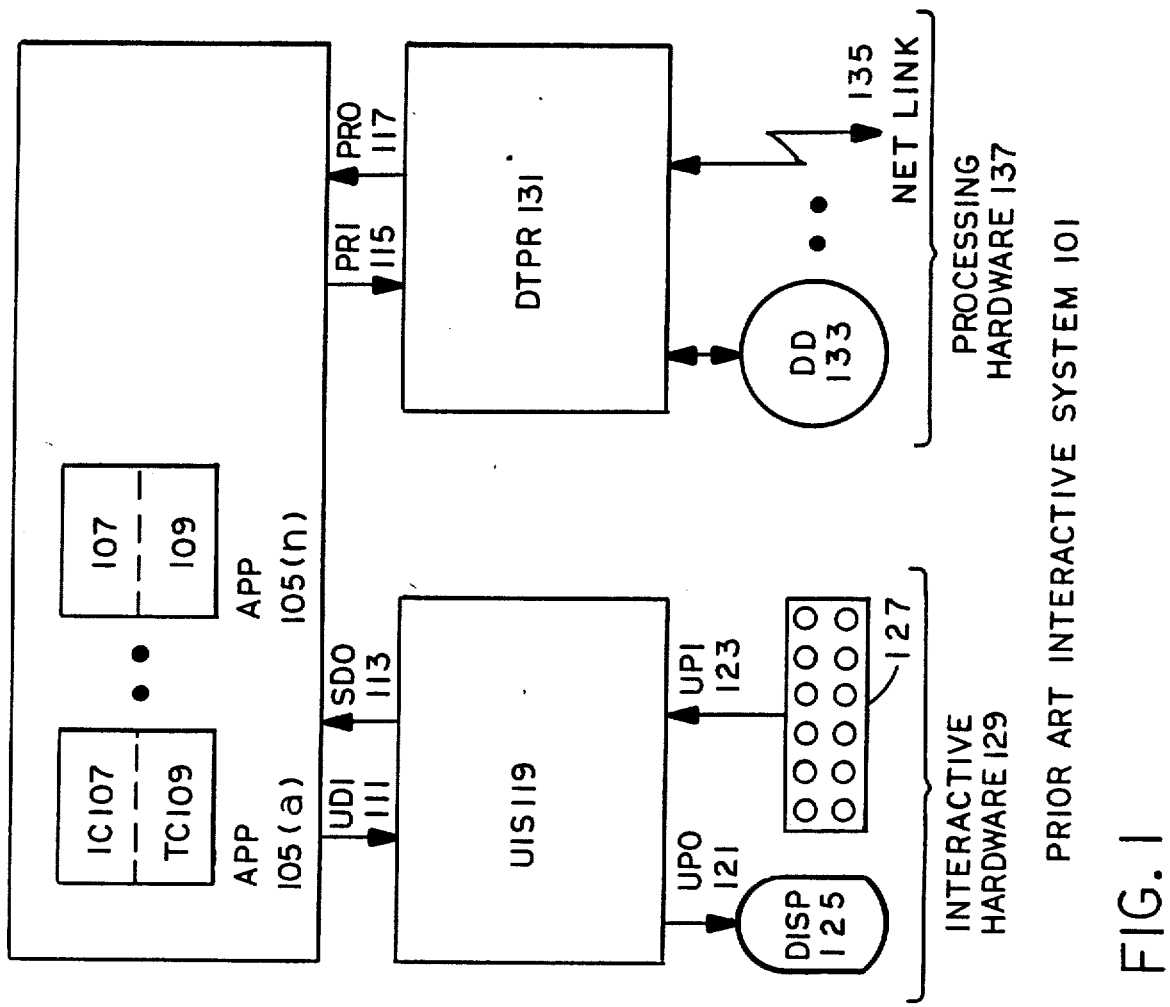
FIG. 1 is a block diagram of a prior-art interactive system.

For ease of reference to the figures, the reference numbers used in the description of the preferred embodiment have 3 or 4 digits. The two least-significant digits are reference numbers within a drawing; the remaining digits are the drawing number. For example, the reference number 1301 refers to an item shown for the first time in FIG. 13.

DESCRIPTION OF A PREFERRED EMBODIMENT

The following Description of a Preferred Embodiment of the present invention will begin with a discussion of states in an interactive system and of the use of a a state manager to control an interactive system, will continue with a discussion of a new technique for analyzing states and transitions between them in interactive systems, and will then disclose a state manager which takes advantage of the new technique. The Preferred Embodiment discussed herein is implemented by means of programs and data descriptions written in the "C" programming language and executed on a microprocessor-based computer, but may be implemented by means of programs and data descriptions written in any programming language and executed on any computer system.

1. States in Interactive Systems

As employed hereinbelow, the term "state" means a condition of an interactive system which is the result either of an input from the user of the sytem or of an output from an application program executed by the system. For example, when a user successfully commands the interactive system to edit a document, he puts the interactive system into an "editing" state which lasts until it is terminated either by another input from the user indicating that he is finished editing or by an output from an application program which requires termination of editing.

The operation of an interactive system may be described as a sequence of one or more states. A given state may further contain substates, i.e., sequences of states which the interactive system enters from the given state and from which the interactive system returns to the given state. For example, once the interactive system is in the editing state, the user can issue editing commands specifying editing operations. On receipt of the editing command, the interactive system enters the substate for the command, which consists of the sequence of states required to carry out the editing command, and on completion of the substate, the interactive system returns to the editing state and awaits another editing command.

Generally, what states make up a multistate sequence is determined by what happens in the states making up the sequence. In the editing example above, if the editing substate is an insertion state and the user provides characters to be inserted, the substate will include a state in which the characters are actually inserted in the document and will return from that state to the editing; if the user does not provide characters but instead indicates that he wishes to return to the editing state, the state which actually inserts the characters will not be included. Determining what state comes next in a multistate sequence and going to that state is termed making a transition from one state to the next.

Designers of interactive systems employ transition networks to represent the sequences of states which may occur in a given interactive system. The transition network consists of a representation of each of the states which the interactive system may enter and of any substates of those states. The representations of the states are connected by lines indicating the transitions between states which may occur in the system. If a transition is conditional, i.e., will occur only if some condition is met on termination of the previous state, that is indicated on the transition line. For example, the transition network for the insert substate would indicate that the transition to the actual insertion state required the presence of characters to insert.

Figure 2:
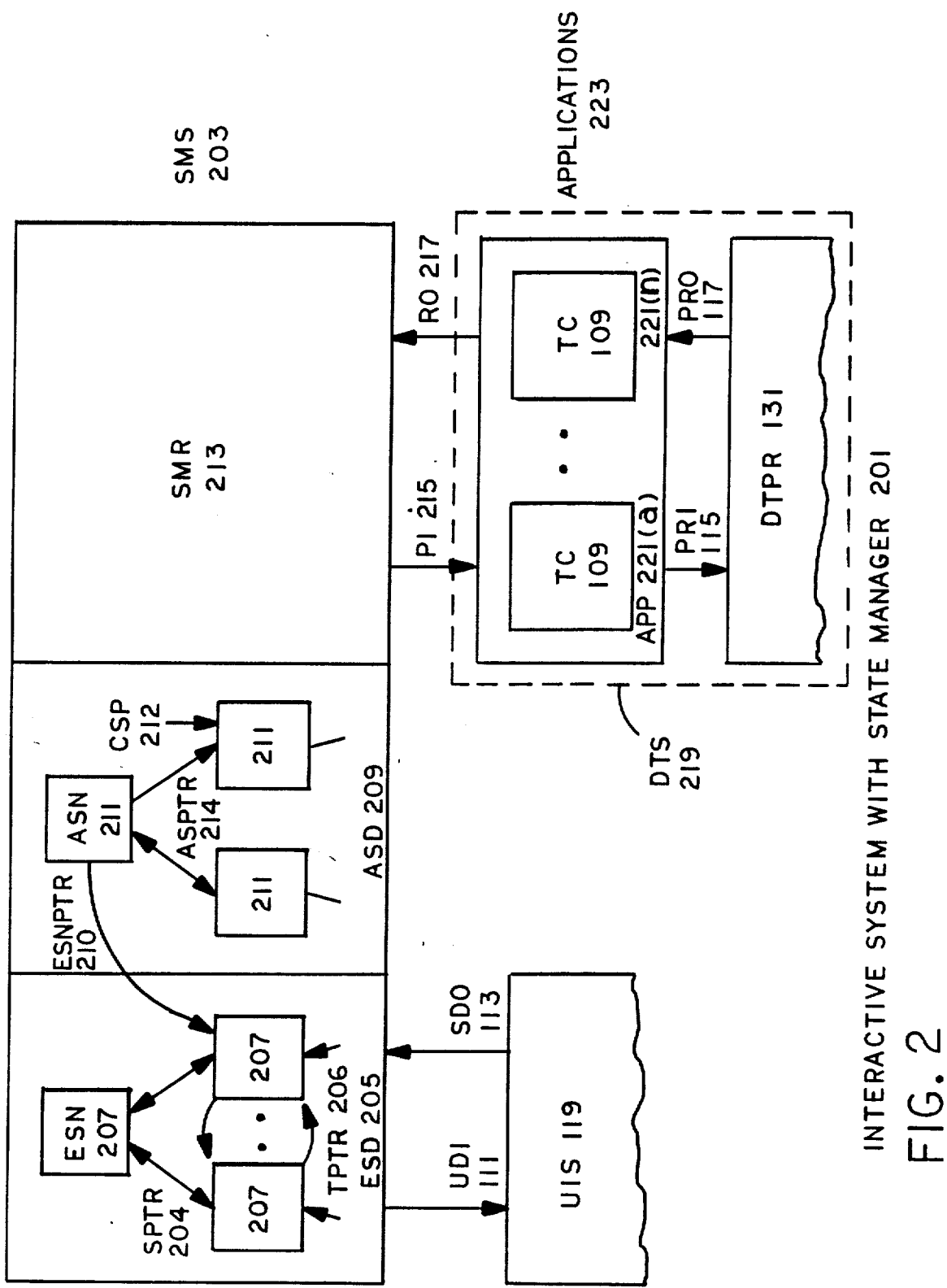
FIG. 2 is a block diagram of an interactive system of the present invention.

2. An Interactive System with a State Manager: FIG. 2

Designers of prior-art interactive systems have used the notions of state, substates, and transitions to think about interactive systems and have used transition networks to design and describe them. Within prior-art interactive systems there has, however, been no single component which maintained information about the present and possible states of the interactive system and employed the information to control the system. Instead, information from the transition networks is distributed throughout the code for the interactive system. For example, if a given application program could be invoked from a number of different states of the interactive system, then the designer of the application program had to make sure that it could be invoked only from those states, and that it did whatever checking was required by each of the states.

Interactive system 201 of the present invention, shown in FIG. 2, includes a component which contains information about the system's present and possible states and employs that component to control the interactive system. The main components of system 201 are user interface subsystem (UIS) 119, data transformation subsystem (DTS) 219, and state manager subsystem (SMS) 203. UIS 119 has the same form and function as in prior-art interactive systems, i.e., it is a library of routines which manage the input and output devices by means of which the user interacts with the interactive system.

DTS 219 performs the actual operations on data specified by the user of the interactive system. It combines two components of prior-art systems: applications 223, consisting of a set of application programs (APP) 221(a..n), and data transformation primitives (DTPR) 131, which are a library of programs which manage the non-interactive portions of the system. The application programs 221 differ in one important respect from those of the prior art: they contain only code relating to the data transformations (TC) 109 and do not contain code relating to the user interface.

SMS 203 contains descriptions of the expected states and active states of the interactive system and manages transitions from one state to another in response to inputs from UIS 119 and DTS 219. Generally, a state transition also involves an output to UIS 119 or DTS 219. In a preferred embodiment of system 201, substantially all communication between DTS 219 and UIS 119 is by way of SMS 203. In response to an output from UIS 119 which is destined for the system (SDO) 113, SMS 203 determines what effect SDO 113 has on the state of system 201 and if the effect requires invocation of an App 221, SMS 203 invokes the application and provides whatever parameters are necessary, as indicated by problem input (PI) 215 in FIG. 2. When an App 221 returns, the return and any return data make up result output (RO) 217. In response to RO 217, SMS 203 determines what the effect of RO 217 is on the state of system 201 and if the effect requires output to the user, provides the output as user-destined input (UDI) to UIS 119. Because SMS 203 handles all communication between DTS 219 and UIS 119, Apps 221 need not have any interactive code 109 to deal with UIS 119.

The components of SMS 203 are expected state description (ESD) 205, active state description (ASD) 209, and state manager routines (SMR) 213. ESD 205 is a data structure which represents the transition network describing the states and transitions of the interactive system. ESD 205 is read by SMS 203, but is altered only when the transition network itself is changed. For each state or substate in the transition network, there is an expected state node (ESN) 207 in ESD 205; transitions are indicated by means of transition pointers (TPTRs) 210, which connect an ESN 207 representing a given state to the ESNs 207 representing states to which transitions may be made from the given state. A given ESN 207 is connected to the first ESN 207 of any substate by means of substate pointer (SPTR) 204. The given ESN 207 is termed a parent ESN 207 and the first ESN 207 of the substate is termed a child ESN 207. In a preferred embodiment, the designer of the interactive system defined by ESD 205 uses a compiler designed for the purpose to generate ESD 205 from a representation of the transition network for the system. Preferably, the representation is graphic. The construction of systems for the manipulation of graphic representations and the compilation of data structures from graphic representations is well-known in the art.

ASD 209 is a data structure which represents a set of active states, i.e., as much of the sequence of states actually generated in the course of the current operation of the interactive system as is required to determine the next state. ASD 209 thus contains all of the data which changes from execution to execution of the interactive system described in the state transition network. ASD 209 further preserves as much of the sequence of states actually generated as is required to "back out" of the present state to a prior state. "Backing out" may be required when SMS 203 receives SDO 113 from UIS 119 indicating either that the user has cancelled his present activity or that he wishes to "undo" his present activity, i.e., restore the interactive system to a prior state. Each state in the set of active states is represented in ASD 209 by an active state node (ASN) 211. Each ASN 211 includes a pointer (ESNPTR) 210 to ESN 207 for the state represented by that ASN 211 and pointers (ASPTR) 214 to any ASNs 211 corresponding to ESNs 207 which are parents or children of the ESN 207 corresponding to the given ASN 211. ASN 211 further contains data by means of which the information required for the specific instance of a given state or substate represented by ASN 211 may be located. The ASN 211 which represents the state or substate which is currently controlling operation of the interactive system is specified by current state pointer (CSP) 212.

SMR 217 contains routines which interpret ESD 205, interpret and update ASD 209, and produce UDI 111 and PI 215 in response to SDO 113 and RO 217. Operation of SMS 203 is as follows: when a user provides inputs which have significance outside UIS 119, for example inputs representing data to be transformed by an App 221, UIS 119 provides those inputs to SMS 203 as SDO 113. In response to the receipt of SDO 113, routines in SMR 213 investigate the current ASN 211, that is, the one specified by CSP 212 to determine whether SDO 113 is relevant to the state represented by that ASN 211. If it is, the routines follow ESNPTR 210 to ESN 207 corresponding to the current ASN and determine whether the input requires a transition to a new state. If it does, the routines follow TPTR 206 to ESN 207 for the new state, update ASD 209 as required for the new state, and if the new state requires invoking an App 211, providing a PI 215 which invokes the proper App 221 with the data contained in the SDO 113. The response to a RO 217 received from DTS 219 is similar, except that in that case, a UDI 111 to UIS 119 may result. If SMS 203 receives an SDO 113 or a RO 217 which requires a backout, the routines use the information in ASD 209 to either cancel the present operation and produce a new state or restore a prior state, as required by the SDO 113 or RO 217, ESD 205, and the current state of ASD 209. In such an operation, SMS 203 determines from SDO 113 and ESD 205 the level in ASD 209 at which the cancellation occurred and then has the lowest-level parent cancel its child ASNs 211, the next level cancel its child ASNs 211, and so on until the proper level is reached.

The advantages of including a state manager in an interactive system include the following:

- Since more context is available, functions such as HELP, CANCEL, and UNDO can be more context determined and thus more useful than in interactive systems without a state manager.
- Since all interactions are defined in the ESD 205, the interactive system appears more consistent to the user and is consequently easier to learn and use.
- The state manager replaces the code controlling UIS 119 in Apps 221. As a result, Apps 221 are smaller and simpler to write.
- Changes in the way the system interacts with the user may be made merely by changing the ESD 205; there is no need to rewrite either UIS 119 or Apps 221.
- Because only ESD 205 need be changed, and because ESD 205 is produced by a compiler, prototyping of interactive systems becomes merely a matter of writing a new source for ESD 205.

Taken together, these advantages permit the experimental design of interactive systems: a prototype may be made, tested on users, modified, and tested again. Given the difficulty of interactive system design, the lack of any theory or even of any general design rules regarding interactive systems and the rapidly changing technology in the area, the importance of such an experimental approach to design is obvious.

Figure 3:
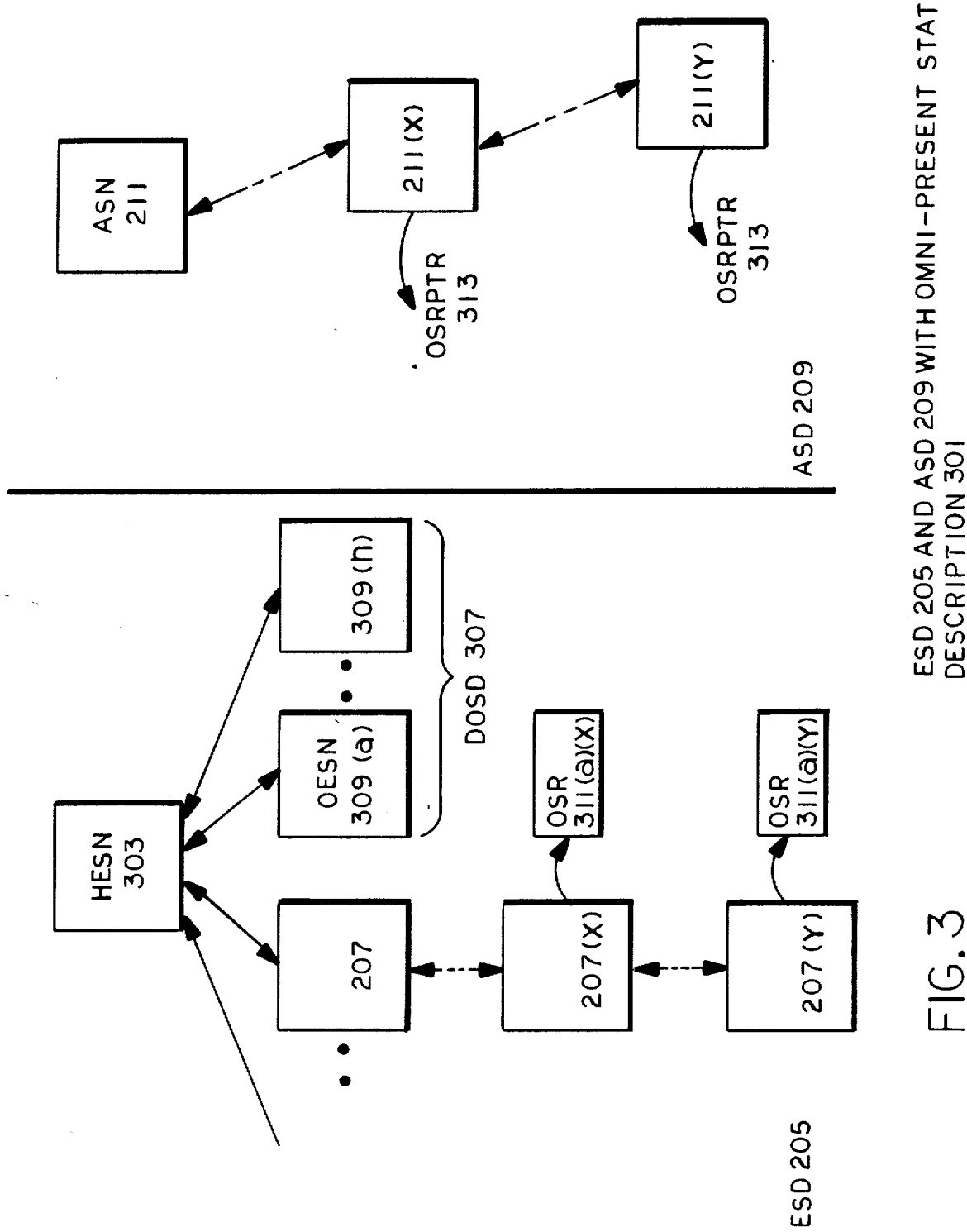
FIG. 3 is a detail of omnipresent state description.

3. Omnipresent State Descriptions: FIG. 3

In many interactive systems, the interactive system must always be prepared to respond to certain user inputs which may happen at any point in an interaction. Examples of such omnipresent user inputs are a keystroke from a special function key, the depression of a button on a pointing device such as a mouse, voice input, or as a result of one of the above, a request for a pull-down menu or the input of a command line. Additionally, any interactive system must be prepared to respond to conditions which may happen as the result of execution of any program. In the state manager of the present invention, the manner in which the interactive system deals with such omnipresent user inputs and conditions is defined by omnipresent state descriptions.

An omnipresent state description is a portion of ESD 205 and ASD 209 which deals only with omnipresent user inputs and conditions. FIG. 3 shows an overview of the omnipresent state description in a preferred embodiment. Beginning with ESD 205, in ESD 205, there is included in the children of the head ESN (HESN) 303 of ESD 205 a set of ESNs which contain descriptions of the omnipresent state. These nodes, shown as OESN 309(a..n) in FIG. 3, make up default omnipresent state description (DOSD) 307. Each OESN 309 defines a default action taken by the interactive system in response to one of the omnipresent user inputs or conditions.

DOSD 307 ensures that a response will always be defined for every omnipresent user input or condition. However, it may be necessary during operation of the interactive system to change the response for a given user input or condition. For example, the interactive system may generally respond in one way to a function key, but that response may not make sense in certain states of the interactive system. Consequently, the omnipresent state description of the present invention has components in ASD 209 which permit temporary redefinition of the response to a given user input or condition. The redefinition is specified in an omnipresent state redefinition (OSR) 311 locatable by means of a pointer in ESN 207 for the state in which the redefinition occurs. In FIG. 3, there is a redefinition of the default state defined in OESN 309(a) in ESN 207(x), indicated by OSR 311(a)(x), and another redefinition in ESN 207(y), a child of ESN 207(x), indicated by OSR 311(a)(y).

When the state specified in an ESN 207 is entered, the ASN 211 which is created to represent the state includes a pointer, OSRPTR 313, by means of which OSR 311 belonging to the ESN 207 may be located. Thus, in FIG. 3, ASN 211(x), corresponding to the state defined in ESN 207(x), OSRPTR 313 locates OSR 311(a)(x). Similarly, in ASN 211(y), OSRPTR 313 locates OSR 311(a)(y). The most recent redefinition governs. Thus, in the states represented by ASN 211(y) and its children, the definition in OSR 311(a)(y) governs; in states represented by ASN 211(x) and its children down to ASN 211(y), the definition in OSR 311(a)(x) governs; in states represented by the topmost ASN 211 and its children down to ASN 211(x), the definition in OESN 309(a) governs. In a preferred embodiment, the foregoing is implemented as follows: when an omnipresent user input or condition occurs, the routines in SMR 213 search the current ASN 211 for a non-null OSRPTR 313. If one is found, the routines follow OSRPTR 313 to OSR 311 and perform the response to the user input or condition specified therein. If there is no non-null OSRPTR 313, or if the located OSR 311 does not define the response to the user input or condition, the routines search the current ASN 211's parents until an OSR 311 is found which does define the response. If none is found, the response specified in the OESN 309 for the user input or condition is performed.

4. Principles of Design of Interactive Systems

While the state manager of the present invention can be used in any interactive system, it is particularly adapted to use in interactive systems which follow certain fundamental design principles. The first of these principles is closure, and the second is normalization.

Closure is a design principle which prevents unexpected system behavior. In a system with good closure, transitions to new states occur only when and in the manner expected by the user. There are two kinds of closure: syntactic closure and semantic closure. Syntactic closure concerns the user. A system has good syntactic closure when the user can understand at any point what input is required from him to put the system into any of the other states to which a transition may be made from the given state. Thus, in a system with good syntactic closure, an input from the user will not produce a state change which the user did not expect or intend, and the user will never be unable to determine how to get from the state the system is presently in into one of the other states to which a transition may be made.

Semantic closure concerns the system. There is semantic closure when the system has enough information to undertake a state transition. The information may come by means of user inputs, or if there are not enough user inputs, the system may use defaults or information about the present state of the system to undertake the transition. Syntactic closure is a prerequisite of semantic closure, but conditions of the system may result in the failure of semantic closure. In that case, the user must be provided with a response to his syntactic closure. If syntactic and semantic closure are properly designed, semantic closure will neither occur when it is not expected, i.e., when the user did not perceive that there was syntactic closure, nor will there fail to be a response when one was expected, i.e., when the user perceived that there was syntactic closure.

An interactive interface is normalized when it does not create cognitive dissonance in the user. A user experiences cognitive dissonance when there is a difference between the manner in which the user expected the interactive interface to perform and the manner in which it actually performs. There are three levels of normalization. Each level includes the preceding levels. In a system with first level normalization, there is nothing in the user interface which apparently can be used but in fact cannot be. An example of a system without first level normalization is one in which a menu has picks which are in fact not available to the user. In a system with second level normalization, there is good closure, so that transition from one state of the system to the other matches the user's shift of attention from one activity to another. In a system with third level normalization, there is no non orthogonal system behaviour. An example of a system without third level normalization is one in which different applications perform text editing operations using different sets of text editing commands. As is clear from the preceding discussion of interactive systems with state managers, the state manager component makes it easier to design and construct interactive systems with good syntactic closure and high levels of normalization. As will become apparent from the following discussion, a preferred embodiment of the state manager is particularly advantageous for the design of such interactive systems.

5. Transition Networks using State Capsules: FIGS. 4 and 5

In a preferred embodiment of state manager subsystem (SMS) 203, ESD 205 is a representation of a transition network which employs state capsules. FIG. 4 shows state capsules and the types of state represented in ESD 205. State capsule 401 is used in a transition network in place of the more traditional simple circle representing a state. State capsule 401 has three parts: initiation 405, which represents actions which must be taken to initiate the state, state 403, which represents the state itself, and completion 407, which represents actions taken on completion of the state. Initiation 405 is further subdivided into entry 409, which defines what conditions must be fulfilled before the state can begin, and activate 411, which specifies the actions required to begin the state. If the state represented by capsule 401 has no substate, activate 411 specifies invocation of a routine; if it does, activate 411 specifies entry into the substate. Completion 407 is further divided into exit 413, which determines whether any conditions for exit from the state have been fulfilled and transition 415, which locates entry 409 for the next state.

State 403 in a state capsule 401 may have one of four types. The types are represented by the shape of state 403 in state capsule 401. Where state 403 is a circle, state 403 is a parent state 419, i.e., its action is to activate one or more substates and establish relationships between them. Where state 403 is a diamond, state 403 is an interactive state 421, i.e, its action is to invoke a routine in user interface subsystem 119; where state 403 is a rectangle, state 403 is program state 423, i.e., its action is to invoke a routine in data transformation subsystem 219. Where state 403 is a diamond in a circle, state 403 is omnipresent state 425, i.e., its action is to respond to an omnipresent input or condition. All of the states but parent state 419 are terminal, i.e., they respond to an input to or produce an output from SMS 203.

The manner in which state capsules 401 are used to show the expected states of an interactive system is shown in FIG. 5. That figure shows expected states in a portion of a text editing system which can select a range of text and perform a copy, delete, or move operation on the selected text. FIG. 5 presumes that the range and the operation may be selected in either order or concurrently.

The text editing system is executed from another application program being executed by the user. Consequently, the states of the text editing system are substates of EDIT state 517 of application state 519, a portion of the state of the application program. The substates of EDIT state 517 include states which are immediate substates or children 501 of the parent EDIT state and states which are substates of the immediate substates. Thus, SELECT substates 503 are substates of the SELECT substate of EDIT and MOVE substates 505 are substates of the MOVE substate of EDIT. COPY and DELETE also have substates similar to those for move, but these substates are not shown in FIG. 5. Substates which are children of a given state are termed peer substates. Thus, OPS, SELECT, COPY, DELETE, and MOVE are peers.

The sequences of states which can be expected to occur in the system of FIG. 5 are defined by the ENTRY and TRANSITION portions of the state capsules 401. Each TRANSITION portion 415 of a given state capsule 401 includes a list of destination names 511. The names determine which state capsules 401 represent a state which may be the next state following the state represented by the given state capsule. When the state represented by a given state capsule 401 is ready to make a transition, it "broadcasts" one of the destination names 511. Similarly, each ENTRY portion of a given state capsule 401 includes a list of entry names 507, which are the names by which the state represented by the given state capsule 401 can be specified in the TRANSITION portions. Transition between one state and another in a group of peer substates occurs when the first state "broadcasts" a destination name 507 which is an entry name 507 of another state and all other conditions for entry into the other state are met. As implied by the foregoing, entry into the other state may require that a group of simultaneously active states are broadcasting destination names.

Additionally, there are a number of special entry names 507 and destination names 511. The TO PARENT destination name 513 specifies that the parent state of the substate specifying the TO PARENT destination name be exited. The TO START destination name 515 specifies that any peer state with a START entry name 509 can be entered. Which one is entered will depend on inputs to SMS 203. The START entry name 509 specifies states which are activated when a parent state is activated and also specifies states which may be entered as described above by means of a TO START destination name 515.

As an example of how FIG. 5 represents a possible sequence of states, assume that the user of the application state has provided input to the system which indicates that he wishes to perform an editing operation.

Consequently, the EDIT state becomes active and with it, all of its children which have the START entry name, all of their children with the START entry name, and so forth.

Assuming that the user next inputs an operation specifier which specifies a move operation, the system enters the ops state and reaches TRANSITION 415, where it attempts a transition to the MOVE state by broadcasting the "m" destination name, indicating a move operation. Since entry to the MOVE state can occur only when two destination names, "m" and "st" are being broadcast, the transition does not occur yet.

Having specified the operation, the user next selects either the beginning or the end of the text to be moved. Assuming he selected the beginning, the system responds to that input by entering the BEGIN state and attempting a transition from there to the SEL TXT state by broadcasting the "a" destination name. Since SEL TXT also requires the "b" destination name, the transition does not occur yet. Next, the user selects the end, and the system enters the END state. Thereupon a transition is attempted to SEL TXT by broadcasting the "b" destination name. This time, the transition succeeds, the program of SEL TXT is executed, and SEL TXT transitions to the EXIT portion of SELECT, which in turn "broadcasts" the entry name "st". Now that both "m" and "st" are being broadcast, the transition to the MOVE state takes place and the DEST substate of MOVE is activated. When the user specification of the destination comes, DEST broadcasts the exit name "c". "st" is already available, so the MVE state is entered and the program which does the moving is executed. When it finishes, MVE transitions to its parent, which has the TO START destination name. Consequently, the system again waits for input. In this condition, ops, select, begin, and end remain active. As indicated by TO PARENT destination name 511 one of the operations specifies the end of the editing session, as indicated by TO PARENT destination name 511, and when an input causing the ops state to specify that transition occurs, the result is an exit from EDIT state 515 and the deactivation of all active child states of edit.

Figure 8:
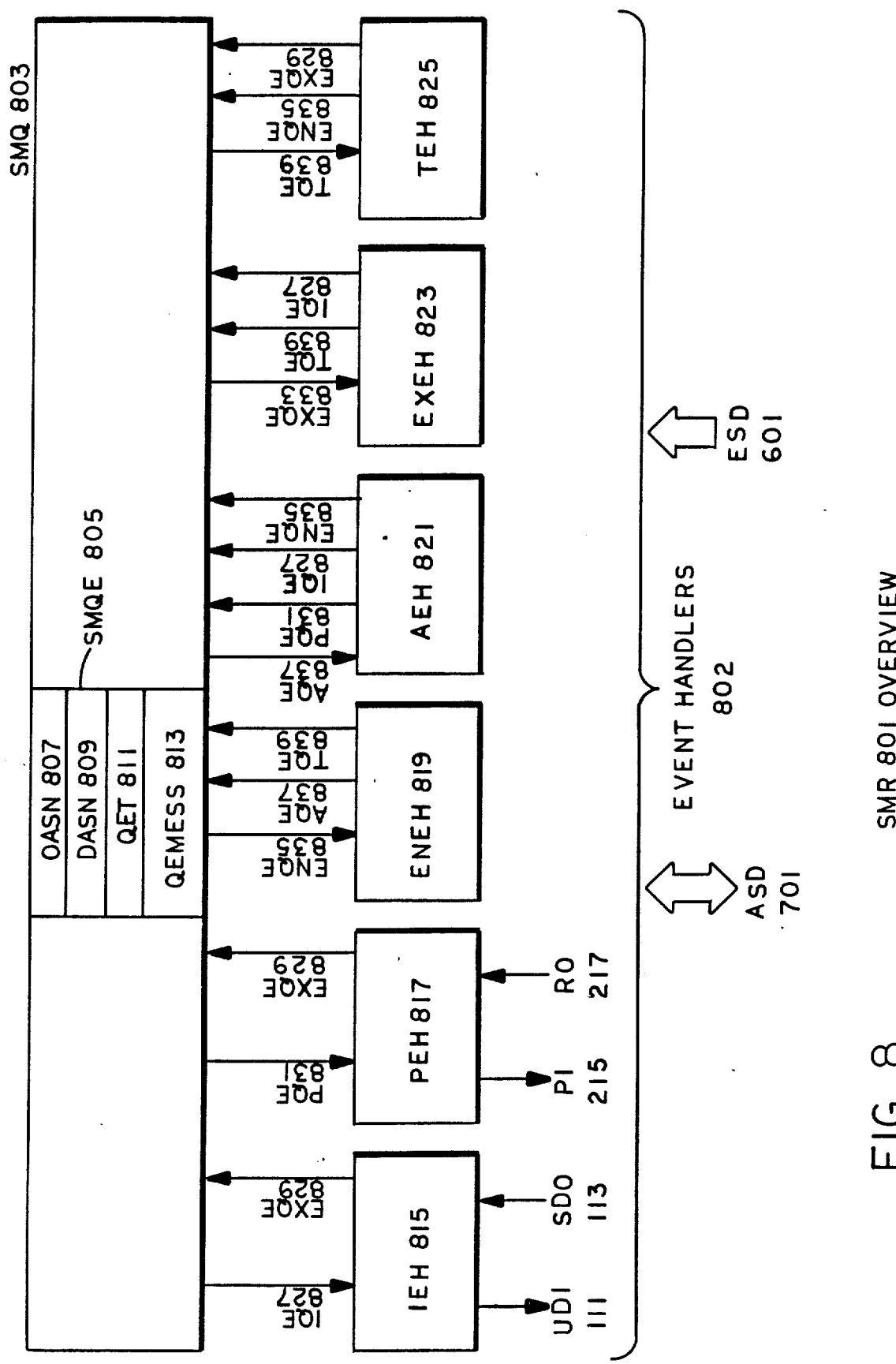
FIG. 8 is an overview of SMR 801 of the present invention.

6. Overview of a Preferred Embodiment of SMS 203: FIGS. 6–8

A preferred embodiment of state manager subsystem (SMS) 203 operates in accordance with the state transition networks just described. The following discussion will provide overviews of the expected state description, of the active state description, of the state manager routines, and of the operation of the preferred embodiment.

a. Overview of a Preferred Embodiment of the Expected State Description: FIG. 6

FIG. 6 is an overview of an exemplary expected state description (ESD) 601 in a Preferred embodiment. The source of ESD 601 is the transition network of FIG. 5. As previously mentioned, ESD 601 may be produced by a compiler from a representation of the transition network such as that in FIG. 5. ESD 601 consists of one expected state node (ESN) 603 for each state of FIG. 5. Data in ESN 603 represents the information specified in the corresponding state capsule 401. Thus, there is data specifying entry names 507 and entry conditions, the activation actions required for the state, the action of the state itself, any exit conditions, and the destination names 511 in transition 415. The entry names and destination names together specify transitions between states and thus fill the function of TPTR 206 or ESD 205. each ESN 603 has a pointer to its parent ESN 603 and pointers to any child nodes 603.

b. Overview of a Preferred Embodiment of the Active State Description: FIGS. 7 and 7A FIGS. 7 and 7A show active state description (ASD) 701 as it exits at four points during the edit state. As shown in these figures, ASD 701 is a tree of active state nodes (ASN) 705, each of which represents an active state of those represented in ESD 601. A pointer in each ASN 705 (not shown in FIGS. 7 and 7A) links the ASN 705 to ESN 603 for the state it represents. A given ASN 705 is linked by pointers to the ASN 705 representing the parent state of the state represented by the given ASN and to the ASNs 705 representing the immediate child states of the give ASN 705.

An example of the manner in which ASD 701 changes during a state is provided by FIGS. 7 and 7A. There are a number of general rules governing the changes:

When a state represented by an ASN 705 becomes active, all of the child states of the state represented by the ASN which have the START entry name are added to the ASD and are activated.

When entry is gained into a state, ASNs 705 representing peer states from which transitions were made to that state are removed from the ASD.

When a destination name corresponds to an entry name for a state which is not yet active, an ASN 705 for the state is added to ASD 701. Since the state is not yet active, no ASNs 705 for child states are added.

Thus, as shown in ASD 709, when the edit state becomes active and the EDIT ASN 705 is added to the ASD, ASNs 705 are also added for SELECT and OPS, since, as can be seen from FIG. 5, they both have START entry names 509, and for BEGIN and END, since these are children of the SELECT ASN 705 which themselves have START entry names. What states are to be activated is determined from ESD 601, which identifies OPS and SELECT as the START substates of EDIT and BEGIN and END as the START substates of SELECT. CSP 212 is at the OPS ASN 705 because its ESN 603 is to the left of that for SELECT.

ASD 702 shows the ASD when the user first performs the SELECT operation and has already specified the beginning and end points. When the first of these points is specified, a transition is reached with a destination name which is an entry name for the sel text state. Consequently, a sel txt ASN 705 is added to ASD 702; when the second point is specified, the sel txt ASN 705 becomes active, as is indicated by CSP 212 and a text selection routine of Apps 221 is executed. On entry into sel text ASN 705, the ASNs 705 for BEGIN and END are removed. Again, the destination names, entry names, and entry conditions from the ESNs 603 for the states in ESD 601.

After the text selection routine has been executed, the transition stage of the state represented by sel text ASN 705 is reached with the destination name TO PARENT. The state represented by SELECT ASN 705 then exits to the transition with the destination name "st". This is an entry name for the copy, delete, and move states, so ASNs 705 for these states are added. The next input from the user is most probably a specification for a copy, move, or delete operation. That specification is relevant to the state represented by OPS ASN 705, so that ASN 705 becomes active and CSP 212 points to it. In response to the input, the state represented by OPS ASN 705 exits with the destination name of one or the operations, here, "m" for move. The move state now has both of its entry conditions fulfilled, so the state is entered. MOVE ASN 705 activated, and ASD 707 produced. The ASNs 705 for select, copy, ops, and delete have been removed from the ASD 701, the ASN 705 for MOVE's child DEST has been added and activated, and CSP 212 points to DEST ASN 705.

c. Overview of a Preferred Embodiment of State Manager Routines: FIG. 8

As shown in FIG. 8, ESD 601 is read and ASD 701 read and manipulated by state manager routines (SMR) 801. SMR 801 includes a set of event handler routines 802 which communicate with each other by means of messages sent via state manager queue (SMQ) 803. A driver loop (not shown) continues execution as long as there is a message in the queue. The preferred embodiment includes six event handler routines. The routines correspond to ENTRY 409, ACTIVATE 411, STATE 403, EXIT 413, and TRANSITION 415 of state capsule 401.

Interactive event handler (IEH) 815 deals with inputs from and outputs to UIS 119, as shown by UDI 111 and SDO 113. It thus corresponds to the interactive state in a state cluster 401 having that type.

Program event handler (PEH) 817 deals with inputs to and outputs from applications 223, as shown by PI 215 and RO 217. It corresponds to the program state in a state cluster 401 having that type.

Entry event handler (ENEH) 819 determines whether the conditions specified by ENTRY 409 for the state have been fulfilled; if they are, ENEH 819 permits entry into the state.

Activate event handler (AEH) 821 activates states. In some cases, this means initiating interactions via UIS 119, in others, executing an application program, an in others, activating substates.

Exit event handler (EXEH) 823 determines whether the conditions for exit from a state have been met.

Transition event handler (TEH) 825 manages the transition to the next state.

The messages between the event handlers are contained in SMQ entries (SMQEs) 805. Each SMQE 805 has the following fields:

Originating ASN (OASN) 807, indicating the ASN 705 representing the state which originated the message;

Destination ASN (DASN) 809, indicating the ASN 705 representing the state which is the destination of the message, if the state is presently represented by an ASN 705.

Queue entry type (QET) 811, indicating the type of SMQE 805. A SMQE 805's type determines which handler 102 will respond to the message.

QE message (QEMESS) 813, the message for the handler 802. The form of the message varies with the SMQE 805's QET 811.

There are six types of SMQE 805: IQE 827, EXQE 829, PQE 831, ENQE 835, AQE 837, and TQE 839. FIG. 8 shows that each of these types is received by its corresponding handler 802, and that the handlers produce the types as follows:

| Event Handler | SMQE Types Produced |
|---|---|
| IEH 815 | EXQE 829 |
| PEH 817 | EXQE 829 |
| ENEH 819 | AQE 837, TQE 839 |
| AEH 821 | PQE 831, IQE 827, ENQE 835 |
| EXEH 823 | TQE 839, IQE 827 |
| TEH 825 | ENQE 835, EXQE 829 |

The preceding table also shows the manner in which the parts of a state represented by the parts of a state cluster 401 communicate with each other. Beginning with IEH 816 and PEH 817, these handlers 802 can only communicate with EXEH 823, i.e., EXEH 823 is always executed after the interaction or program represented by a state is finished. EXEH 823 can communicate with TEH 825 or IEH 815. It does the first when when a transition to the next state follows the exit; it does the second when a condition arises during the exit or transition to the next state which requires further interaction. TEH 825 can communicate with ENEH 819 or EXEH 823; it does the first when there is a transition to a new state; it does the second when it receives a message from ENEH 819 indicating that the transition cannot occur or when it receives a message from ENEH 819 indicating that the transition did occur and that fact has to be communicated to EXEH 823. ENEH 819 can communicate with AEH 821 or TEH 825; it does the first when an entry into the state has occurred and the state can be activated; it does the second in order to accept or reject the receipt of a destination name from a transition or to confirm or deny entry into the state. AEH 821 can communicate with IEH 815, PEH 817, or ENEH 819. Communications with the first two occur when the state is a terminal state, and consequently, an interaction or program must be executed; communication with ENEH 819 occurs when a substate must be activated.

As may be seen from the foregoing, there is two-way communication between states in the preferred embodiment of SMS 201. Such two-way communication greatly eases "backout" and thereby facilitates the construction of systems having good syntactic closure, good recovery from failure to achieve semantic closure, and powerful cancel and undo operations.

d. Overview of Operation of a Preferred Embodiment of the State Manager

The following overview of the operation of a preferred embodiment of SMS 201 describes the operation of SMS 201 during the operation of selecting text. At the beginning of the operation, the interactive system is in the EDIT state and has just executed a TO START transition. As a result, the ASD is ASD 709 and TEH 825 has produced an IQE 827 to IEH 815 specifying that IEH 815 is to produce the interactive output indicating termination of the preceding operation and to wait for interactive input. When the interactive input arrives, IEH 815 determines from its form and from the ESNs for OPS, BEGIN, and END which of the active terminal states the input is intended for. Assuming that the input is for BEGIN, IEH 815 prepares an EXQE 829 specifying that the BEGIN state is ready to be exited and places it in SMQ 803. The EXQE 829 includes the value for the beginning of the text. When EXEH 823 receives the message, it checks BEGIN ESN 603 for any exit conditions. If there are any and the conditions are fulfilled, a transition to the next state can be attempted, so EXEH 823 prepares a TQE 839, again including the value for the beginning of the text. If the conditions are not fulfilled, EXEH 823 prepares an IQE 827 specifying an interaction to indicate to the user that the beginning of the text was not properly specified. In response to the next user input, IEH proceeds as described above.

In response to the TQE 839, TEH 825 examines the BEGIN ESN to determine what destination name 511 is to be used in the transition. In this case, there is only one, "a", so TEH 825 prepares an ENQE 835 containing the value for the beginning of the text and the "a" destination name 511. ENEH 819 responds to the ENQE 835 by examining the peer ESNs 603 of the BEGIN ESN to determine which of them has the "a" entry name 511. In this case, it is SEL TXT ESN 603 and there is at present no ASN 705 for it. Consequently, ENEH 819 creates an ASN 705 and adds it to the ASD to produce ASD 702. Next, ENEH 819 determines from SEL TXT ESN 603 whether all entry conditions for the SEL TXT state have been met. In this case, there are two inputs required, but there is at present only one, so ENEH 819 sends a TQE 839 to TEH 825 acknowledging receipt of the "a" entry name. TEH 825 responds to the TQE 839 by sending an EXQE to EXEH 823 indicating that exit from the state is not yet possible, and EXEH 823 sends an IQE 827 to IEH 815, which causes UIS 119 to indicate to the user that another input is required.

When the input arrives, it is for the END state, so the preferred embodiment of SMS 201 proceeds as described above for BEGIN, except that this time the ASN 705 for SEL TXT already exists. This time, ENEH 819 determines that both inputs for the SEL TXT state are available, so it sends an AQE specifying activation of the SEL TXT state to AEH 821, which attempts to activate the state. If it succeeds, it returns an ENQE 835 to ENEH 819, which responds thereto by sending TQEs 839 to TEH 825 for both the BEGIN and END states confirming the transition from those states. TEH 825 responds to the messages by removing the BEGIN and END ASNs from ASD 702. If it fails, it returns an IQE 827 to IEH 815, which then produces an interaction to remedy the situation. On success of the activation, AEH 821 further sends a PQE 831 to PEH 816, which reads the SEL TXT ESN 603 to determine which program is to be invoked and invokes the program. On return, PEH 817 produces an EXQE 829 and transition to the next state proceeds as just described.

7. Detailed Discussion of ESN 603: FIGS. 9-11

FIG. 9 is a high-level drawing of a single ESN 603 in a preferred embodiment. Each ESN 603 in ESD 601 represents one state which the interactive system may enter. ESN 603 has five components which are linked by pointers which appear as lines in FIG. 9. Expected state capsule 901 represents state capsule 401 for the state and contains pointers to the other components and parent pointer (PPTR) 911 to its parent ESN 603 in ESD 601.

Three of the remaining components are trees of nodes defining actions to be taken and conditions to be fulfilled in the course of initiating and completing the state represented by ESN 603. The remaining component is expected activate table 905, which defines the action to be performed by the state represented by ESN 603. The following discussion will first discuss the node trees and then expected activate table 905.

a. Node trees in ESN 603

There is an expected entry tree 903, an expected exit tree 907, and an expected transition tree 909. Each node tree is interpreted by its corresponding event handler 802. The QEMESSs 813 received by the event handler have various types, and each type has a name. There is a terminal node in each tree for each of the names, and where the interpretation of the message depends on other QEMESS's 814 received by the event handler, the relationship between the messages is determined by the relationships between the leaf nodes corresponding to the messages.

Expected entry tree 903 is a tree which indicates how ENEH 819 is to respond to ENQEs 833. Each ENQE 833 has an entry message name. Some of the names are entry names 507 and specify ENQEs 833 from other states which are trying to gain entry to a given state; others indicate other kinds of ENQEs 833. Where the action to be taken in response to one ENQE 833 is dependent on another ENQE 833 received earlier, tree 903 defines the dependency. For example, if a state must receive two ENQEs 833 with different entry names 507 before the state can be entered, tree 903 indicates that fact and the relationship between the names.

Expected exit tree 907 is a tree which indicates how EXEH 823 is to respond to EXQEs 833. Each EXQE 833 includes an exit name indicating the kind of ENQE 833. The tree defines dependencies between exit names in the same fashion as expected entry tree 903. Expected transition tree 909, finally, is a tree which indicates how TEH 825 is to respond to TQEs 839. Again, each TQE 833 includes a transition name indicating the kind of TQE 833 and the tree indicates relationships between the transition names.

The trees in ESN 603 all have the same structure and differ only in their contents. Since the contents are apparent from the functions of the event handlers 802 which interpret them, only one ESN tree is shown in detail. That ESN tree 1001, shown in FIG. 10, is Expected Entry Tree 903. Tree 903 consists of entry tree nodes 1005. Each entry tree node 1005 has the following contents:

parent pointers 1011 pointing to parent nodes 1005 in the tree. In the root node 1005 of the tree, parent pointer 1011 points to active state capsule 1201.

child pointers 1011 pointing to child nodes 1005 in the tree. In the case of terminal nodes 1005, all of the child pointers are null.

a pointer to node action data 1015 specifying actions to be taken when a QEMESS 813 involves the node. The pointer may be null.

The other contents of expected entry tree node 1005 depend on whether the node 1005 is a terminal node. If it is, node 1005 contains an entry message (EMESS) name 1009 indicating the type of ENQE 835 the node responds to. If node 1005 is not a terminal name, it represents a relationship between two or more terminal nodes 1005 and node 1005 contains a condition 1007 governing that relationship instead of EMESS name 1009. For example, if the state represented by ESN 603 must have received destination names 511 "a" and "b" before it can become active, expected entry tree 1003 for that ESN 603 will have a terminal node 1005 for which "a" is EMESS name 1009, a terminal node 1005 for which "b" is EMESS name 1009 and both of those nodes will have a parent node 1005 in which condition 1007 is "a" AND "b", specifying that the state represented by ESN 603 must receive both names.

The node actions specified in node action data 1015 may include the execution of a non-interactive program or the sending of an SMQE 813. For example, node actions specified for a terminal node 1005 may include sending a TQE 839 rejecting an ENQE 835 with a given entry name 507 because the entry port specified by the name is latched shut, acknowledging receipt of an ENQE 835 containing the terminal node's entry name 507, latching its own or another terminal node so that further ENQEs 835 for the terminal node will be rejected, and executing a program to put data received with an accepted ENQE 835 into proper form for use in the state represented by ESN 603. Node actions specified for a non-terminal node 1005 may include sending an AQE 837 activating the state represented by ESN 603, sending TQEs 839 to the states which have requested entry confirming that entry has been achieved, latching or unlatching terminal nodes, and executing a program which combines data from child nodes of the non-terminal node.

b. Expected activate table 905

Expected activate table 905 contains static information required to perform a state's action. The table's contents depend on the type of the state represented by ESN 603. As shown in FIG. 11, when ESN 603 represents a parent state 419, expected activate table 905 contains substate specifications 1101. In a preferred embodiment, substate specifications 1101 include child pointers (CPTRs) 913 pointing to ESNs 603 for the child states. When ESN 603 represents an interactive state 421, expected activate table 905 contains interactive specifications 1103. In a preferred embodiment, interactive specifications 1103 is a list of interactive specifications. Each specification may specify a window, a menu, a form, or function keys. When ESN 603 represents a program state 423, expected activate table 905 contains a pointer to the program of Apps 221 to be executed. When ESN 603 represents an omnipresent state 425, activate table 905 contains a list of redefinitions of whatever omnipresent state is redefined in that ESN 603. Thus, in a preferred embodiment, OSR 311 is a child ESN 603 of the ESN 603 in which the omnipresent state is redefined.

8. Detailed discussion of ASN 705: FIGS. 12–14

Each ASN 705 represents a state which is currently relevant to a given execution of the interactive system represented by an ESD 601 and contains the execution-dependent data required for that state. As shown in FIG. 12, an ASN 705 is generally analogous in its structure to its corresponding ESN 603. It has an active state capsule 1201 which includes APPTR 1209, a pointer to its parent ASN 705, ACPTRS 1211, pointers to any child ASNs 705, ESNPTR 1211, a pointer to ESN 603 defining the state represented by ASN 705, and pointers to four other components: active entry tree 1203, active activate table 1204, active exit tree 1205, and active transition tree 1207.

a. Active State Node Trees: FIGS. 13 and 14

Trees 1203, 1205, and 1207 of ASN 705 correspond to trees 903, 907, and 909 of ESN 603. FIG. 13 presents a detail of one ASN tree 1301, active entry tree 1303 corresponding to expected entry tree 903. The other ASN trees 1301 are similar and will not be described in detail. Active entry tree 1303 is made up of active entry tree nodes (AENTN) 1305. Each AENTN 1305 has a pointer (EETNPTR 1323) to the corresponding expected entry tree node 1005 of ESN 603 corresponding to ASN 705, one or more parent node pointers 1307 to its parents, and child node pointers 1309 to its children. The root AENTN 1305 points to active state capsule 1201 and terminal AENTNs 1305 have null child pointers.

The content of an AENTN 1305 depend on whether it is a terminal or non-terminal AENTN 1305. The contents of a terminal AENTN 1305 are provided by a QEMESS 813 in a SMQE 805 whose QET 811 specifies that it's a ENQE 835. As shown in FIG. 14, such an entry QEMESS 1401 contains EMN 1403, indicating one of the entry message names in the terminal expected entry tree nodes 1005, and data pointer (DPTR) 1405, a pointer to the data which accompanies the QEMESS 813. As may be seen from FIG. 13, EMN 1403 from QEMESS 1401 is stored in entry message name (EMN) 1312. The field SASNPTR 1313 receives the pointer contained in OASN 807 of SMQE 805 containing entry QEMESS 1401, and thus indicates the ASN 705 representing the state which is the source of the SMQE 805, and DPTR 1405 is stored in NDATA 1325. LSTATE 1315 indicates whether terminal AENTN 1311 is latched and therefore cannot receive entry messages LSTATE 1315 is set or reset as determined by a node action in the corresponding expected entry tree 1003. A non-terminal AENTN 1319 contains condition result 1321, which is the result of application of condition 1007 specified in the corresponding expected entry tree node 1005 to the data provided by the children of the non-terminal AENTN 1319, and NDATA 1325, which is the data produced by any node action 1015 specified in the corresponding expected entry tree node 1005.

In a preferred embodiment, an active entry tree 1303 contains only as many nodes as are required to deal with the actual entry messages received so far by the state represented by ASN 705. For example, if the state requires entry messages with the entry names 507 "a" and "b" for entry, ENEH 819 will respond to a first entry message specifying "a" by adding the terminal AENTN 1305 for "a", its parent, and its parents to the tree until the root node is reached. CR 1321 in the parents will be set to FALSE. When the second entry message specifying "b" is received, ENEH 819 will add the terminal AENTN 1305 for "b" and its parents up to any AENTN 1305 which relates it to "a". Thereupon, if the tree below the AENTN 1305 which relates "a" to "b" is complete, ENEH 819 will execute the condition relating "a" to "b" specified in the expected entry tree node 1005, will place the result in CR 1321, and will take any actions specified in node action 1015 of the corresponding expected entry tree node 1005.

b. Active Activate Table 1204

Active activate table 1204 specifies the data used by this particular execution of the interactive system described by expected state description 601 to perform the action specified for the state represented by ASN 705. Active activate table 1204 contains a pointer (EATPTR) 1213 to the corresponding expected activate table 905. Otherwise, its contents depend on the type of the corresponding expected activate table 905. If the corresponding expected activate table is a substate specification 1101, active activate table 1204 specifies any data required for or resulting from activation; if it is an interaction specification 1103, active activate table 1204 specifies any data required for or resulting from the interaction; if it is a program specification 1105, active activate table 1204 specifies any parameters for the program. If it is an omnipresent specification 1107, active activate table 1204 specifies any data required for or resulting from the interaction specified by the omnipresent specification. EATPTR 1213 in the omnipresent specification 1107 functions as OSRPTR 313 in a preferred embodiment.

Conclusion

The foregoing Description of a Preferred Embodiment has made known to those skilled in the art the best mode presently known to the inventor of implementing the state manager of the present invention. In employing an active state description as well as an expected state description, the state manager of the present invention is particularly adapted to the construction of interactive systems having good syntactic closure and a high level of normalization. The use of entry names and destination names to specify transitions permits a transition to a new state to occur conditionally, and the maintenance of active state at least until a transition has occurred provides improved feed back to the user and "back out" capabilities.

While the embodiment of the state manager disclosed herein is the best presently known to the inventor, many other versions of the state manager may be made according to the principles disclosed herein by those skilled in the art. Consequently, the disclosed embodiments are to be considered in all respects as illustrative and not restrictive, the scope of the invention being indicated by the appended claims rather than the foregoing description, and all changes which come within the meaning and range of equivalencey of the claims are intended to be embraced therein.

What is claimed is:

1. An interactive system comprising:
   (1) a user interaction subsystem for controlling an interactive device belonging to the interactive system, the user interaction subsystem receiving a user-produced input from the interactive device and a user-destined input and producing a user-perceivable output of output to the interactive device and a system-destined output;
   ((2) a data transformation subsystem which receives a problem input and produces a result output; and
   (3) a state manager subsystem for managing transitions between states of the interactive system, the state manager subsystem receiving state manager inputs including the system-destined output and the result output and producing state manager outputs including the problem input and the user-destined input and the state manager subsystem including
      (a) expected state describing means for describing a set of expected states of the states of the interactive system and the transitions therebetween,
      (b) active state describing means for describing a current set of active states of the states of the interactive system, and
      (c) state management means responsive to a state manager input, to the expected state describing means and to the active state describing means for producing the transitions, each transition being produced as required by the current set of active states, the state manager input, and the expected states, producing a new current set of active states, and producing a state manager output in connection with certain of the transitions.

2. The interactive system set forth in claim 1 and wherein:
   each of the active states in the current set of active states corresponds to one of the expected states.

3. The interactive system set forth in claim 1 and wherein:
   the current set of active states includes the active states necessary for backing out to a previous active state.

4. The interactive system set forth in claim 1 and wherein:
   the expected state describing means describes each expected state in the set of expected states by means of an expected state node which represents the expected state and includes means for representing at least one of the transitions;
   the active state describing means describes each active state in the current set of active states by means of an active state node representing the active state, each active state node including means for representing information specific to the active state and means for relating the active state node to a corresponding expected state node;
   the active state describing means further includes means for designating a designated active state node which represents the current state of the interactive system; and
   the state management means employs the means for representing information specific to the active state in the designated active state node and the means for representing at least one of the transitions in the expected state node related to the designated active state node to determine which of the transitions is to be produced.

5. The interactive system set forth in claim 4 and wherein:
   the expected state node further includes
      means for representing one or more entry conditions whose fulfillment is required before the state management means produces the transition to the expected state represented by the expected state node,
      means for representing one or more activation operations which the state management means performs on entry to the represented state, and
      means for representing one or more exit conditions whose fulfillment is required before the state management means produces the transition from the represented state; and
   the state management means produces the transition to the state represented by the expected state node only if the entry conditions have been fulfilled, performs the activation operations upon entry into the state represented by the expected state node, and produces the transition from the state represented by the expected state node only if the exit conditions have been fulfilled.

* * * * *